United States Patent Office 2,781,361
Patented Feb. 12, 1957

2,781,361

PROCESS FOR THE PRODUCTION OF 4-HYDROXYCOUMARIN

Eugene V. Hort, Westfield, N. J., assignor to Nopco Chemical Company, Harrison, N. J., a corporation of New Jersey No Drawing. Application May 9, 1952,
Serial No. 287,037

10 Claims. (Cl. 260—343.2)

This invention relates to 4-hydroxycoumarin and, more particularly, it relates to a new and improved process for producing it.

The production of 4-hydroxycoumarin is not in and of itself unique in the art as several references are presently available which disclose the synthesis of this compound. However, these processes are, in general, commercially impractical and not readily adapted to large scale plant production due to the lengthy or cumbersome procedures involved and to the undesirable reaction conditions which are necessarily employed. One such process is disclosed in Ber. Deut. Chem., 48 (1915), page 28, by Pauly and Lockemann. This process consisted of the addition of an equivalent amount of metallic sodium to molten acetylsalicylic acid methyl ester or to molten phenylacetylsalicylic acid methyl ester and the reaction thereof at temperatures of from about 160° to 175° C. The reaction was accomplished without employing any solvent whatsoever and as a result the reaction mass became very thick and viscous, thus making intimate mixture of the reactants extremely difficult. At the completion of the reaction, the reaction mass solidified in the reactant vessel. It is obvious that such a process would be unsuitable for industrial purposes. Furthermore, it has been reported that the Pauly and Lockemann synthesis is accompanied by undesirable side reactions, the products of which must subsequently be removed. Many separate crystallizations are necessitated, therefore, in order to obtain the desired product in the required degree of purity. While the yields reported by Pauly and Lockemann were quite high, Stahmann and Link in U. S. Patent No. 2,465,293 reported that their many attempts to duplicate the results of Pauly and Lockemann were unsuccessful, since yields of 12% to 14% of 4-hydroxycoumarin were the best they could obtain in any reasonable degree of purity. This patent disclosed another method for the synthesis of 4-hydroxycoumarin. The process consisted in the reaction of an acetylsalicylic acid ester with an alkali metal, an alkali metal alcoholate, or an alkali amide, in the presence of an inert solvent at temperatures of from about 220° to 280° C. This process is likewise attended by certain disadvantages which are not encountered in the practice of the process hereinafter disclosed. The present invention is designed both to remove the disadvantages prevalent in the prior art processes and to give a new and improved method for the production of 4-hydroxycoumarin in a pure form. As will be apparent from the description of the invention, the present process is more readily adaptable to large scale plant production than any of the prior art processes known today and hence represents a substantial advancement in the art.

The object of this invention is to provide an improved method for the production of 4-hydroxycoumarin.

More particularly, it is the object of this invention to provide an economical and efficient method for the production of pure 4-hydroxycoumarin.

Other objects of this invention will in part be obvious and will in part appear hereinafter.

It has been found that the above and other objects of this invention can be accomplished by heating an excess of an acetylsalicylic acid ester in the presence of an alkali metal.

In carrying out the condensation, an excess of the acetylsalicylic acid ester is employed over and above that amount which it is desired to condense. It has been found that such an excess of ester exerts an extremely beneficial solvent effect on the reaction mass. Thus, at all times during the condensation, the mass is capable of being thoroughly stirred with the result that the condensation is greatly facilitated. Moreover, it has been found that the excess ester employed which remains unreacted during the process can be readily recovered and subsequently reused.

In accordance with the disclosure of this invention any acetylsalicyclic acid ester may be condensed to form 4-hydroxycoumarin. However, as a practical consideration, the most suitable and desirable compounds and, therefore, the preferred starting materials for use in the novel process of this invention are methyl acetylsalicylate and ethyl acetylsalicylate. During the course of the condensation reaction, the alkyl group is transformed into the corresponding alcohol. Thus, for example, when the methyl ester is employed a secondary reaction product will be methanol; when the ethyl ester is employed a secondary product will be ethanol. Likewise, if the propyl or butyl ester or any other higher molecular weight ester is employed, the secondary product of the reaction will be the corresponding alcohol. It is for this reason alone, that the use of the methyl and ethyl ester is preferred in carrying out this process. The alcohol formed during the condensation is subsequently removed by the volatilization thereof and thus, by employing the lower molecular esters, the corresponding lower molecular weight, and hence the lower boiling, alcohols are formed. The removal of the alcohol is therefore greatly facilitated. As a practical consideration, the alcohol formed as the secondary product of the reaction can be readily recovered, if desired, by condensing it, using any appropriate means, as it is volatilized from the reaction mixture and collecting it.

The condensation of the acetylsalicylic acid ester is carried out in the presence of an alkali metal. While any one of the common alkali metals, namely, sodium, potassium, or lithium, may be employed in accordance with the disclosure of this invention, in the preferred embodiment of the invention metallic sodium is used. It has been found that the alkali metal is most suitably introduced into the heated acetylsalicyclic acid ester as small particles, and it has been further observed that the best results are achieved when the addition is accompanied by vigorous stirring. The alkali metal employed is preferably added slowly since, the reaction being exothermic, too rapid addition of the alkali metal will make the reaction more difficult to control. In carrying out the process of the invention it has been discovered that the reaction proceeds most efficiently if from about 1.0 mol to 1.2 mols of alkali metal are employed for each 2 mols of acetylsalicylic acid ester present. By employing such ratios of reactants, the acetylsalicylic acid ester will be present in the excess quantity necessary to insure the desired results. The alkali metal salt of 4-hydroxycoumarin is, moreover, obtained in a powdery form and shows no tendency whatsoever to cake or solidify as the products of some prior art processes did.

In carrying out the process of this invention the temperature employed may be varied over a rather wide range. It has been found that the condensation can be effected successfully using temperatures ranging from 110° C. to 210° C. However, from an economical standpoint it has been determined that the reaction is accomplished most efficiently when carried out at a temperature of from about 150° to 175° C., and for this reason temperatures in this latter range are employed in the preferred embodiment of the invention.

The condensation reaction should be carried out with thorough stirring to insure proper condensation and to facilitate the reaction. The condensation, being accomplished in the presence of an alkali metal, yields an alkali metal salt of 4-hydroxycoumarin, which salt is readily converted into the desired 4-hydroxycoumarin. During the course of the condensation it has been observed that the reaction mass takes on the appearance of a pale brown slurry, which is at all times capable of being stirred. At the completion of condensation, the temperature of the reaction mass is adjusted from the reaction temperature employed to a temperature of about 130° C. The mass is treated with a preheated inert solvent, such as naphtha, heptane, octane, nonane, toluene, xylene, etc., which serves merely as a diluent, since the alkali metal salt is insoluble therein, and which is employed solely to facilitate the filtration of the reaction mass. After the diluent has been added, the solution is filtered while hot using suction or other suitable means. The filtrate contains a major portion of the unreacted excess ester of acetysalicyclic acid and the ester can be separated from the diluent and both recovered, in a condition suitable for reuse, by means of a fractional distillation. The pale brown powdery material retained on the filter is the alkali metal salt of 4-hydroxycoumarin. This salt is air dried, following which it is dissolved in water at a temperature of about 65° C. The aqueous solution is subsequently filtered to remove any undissolved material contained therein, and is then adjusted to about a pH of 4.0 by the addition of a mineral acid. The acid solution is extracted with naphtha or other inert solvent, and the aqueous acid solution is then adjusted to a pH of from 1.0 to 1.5 by the addition of further quantities of acid. The solution is allowed to stand at room temperature and the precipitation of crude 4-hydroxycoumarin results. The crude compound is removed from the solution by filtration and dried to constant weight in an oven at a temperature of about 110° C. A product of the desired high degree of purity is obtained by recrystallization from boiling water.

By proceeding in accordance with the disclosure of this invention, the disadvantages prevalent in the prior art processes for producing 4-hydroxycoumarin are virtually eliminated.

For a fuller understanding of the nature and objects of the invention reference should be had to the following examples which are given merely as further illustrations of the invention and are not to be construed in a limiting sense.

*Example I*

In this example 85 grams (0.438 mol) of methyl acetylsalicylate were heated to a temperature of 160° C. To this well stirred and heated mass there was added 5.70 grams (0.248 mol) of metallic sodium. The addition of the sodium was accomplished with constant stirring over a period of about 30 minutes. The reaction mixture was heated and stirred for an additional 30 minutes, at the end of which the reaction mixture had the appearance of a pale brown slurry. The evolution of methyl alcohol occurred during the reaction. The slurry was cooled to about a temperature of 130° C., and at this temperature 50 ml. of previously heated naphtha was added. The resulting dispersion was then filtered with suction, and the material which was retained on the filter was air dried. This material was then dissolved in 350 ml. of water at a temperature of about 65° C. The aqueous solution was filtered and adjusted to a pH of about 4.0 by the addition of hydrochloric acid. The aqueous solution was then extracted with naphtha, following which the aqueous solution was further acidified to a pH of about 1.0. The acidified aqueous solution was then allowed to stand and the precipitation of 4-hydroxycoumarin resulted. The 4-hydroxycoumarin was recovered by filtration, and dried to constant weight in an oven at temperature of about 110° C. The crude 4-hydroxycoumarin, having a melting point of 178–188° C., was obtained in a 20.5 grams yield. This crude product was recrystallized by dissolving it in 1500 ml. of boiling water and allowing the solution to cool to room temperature overnight. The solution was then filtered to remove the recrystallized 4-hydroxycoumarin and the product was dried to constant weight in an oven at 110° C.

The yield of recrystallized 4-hydroxycoumarin was 14.7 grams, or 36.7% of theory, and was obtained as a pale tan powdery material having a melting point of 205–210° C.

*Example II*

To 78.0 grams (0.4 mol) of pure, dry methyl acetylsalicylate there was added 5.05 grams (0.22 mol) of sodium. The sodium was added over a period of about 30 minutes at a temperature of 180–190° C., and during the addition the reaction mixture was stirred vigorously. Methyl alcohol was evolved during the reaction. The reactants were stirred for an additional 10 minutes after the sodium had been added. At the end of this time 50 ml. of preheated naphtha was added to the mass. The solution thus formed was filtered while hot with suction, and the powdery material obtained from the filtration was air dried. The dried powder was then dissolved in about 350 ml. of water at 65° C. and this solution was then filtered to remove any insoluble material contained therein. The solution was adjusted to a pH of about 4.0 with hydrochloric acid, and the acidified aqueous solution extracted with naphtha. The aqueous solution obtained was then allowed to stand, and the product which precipitated was filtered and dried to constant weight in an oven at 110° C. This product was recrystallized by dissolving it in about 1500 ml. of boiling water, and allowing the solution to cool to room temperature overnight. The recrystallized product was subsequently removed by filtration and dried to constant weight in an oven at a temperature of 110° C.

The recrystallized 4-hydroxycoumarin was obtained in a yield of 11.1 grams, or 31.2% of theory, and had a melting point of 202–206° C.

*Example III*

To 77.4 grams (0.4 mol) of methyl acetylsalicylate, 4.6 grams (0.2 mol) of sodium were added. The sodium was added to the ester over a period of about one hour, at a temperature of 140–145° C., and with constant stirring. The evolution of methyl alcohol occurred during the reaction. After the sodium had been added, the reaction mixture was further heated for 15 minutes, following which 50 ml. of naphtha were added. The solution obtained was filtered hot with suction and the powdery product obtained thereby was air dried. This product was subsequently dissolved in 350 ml. of water at a temperature of about 65° C. The resulting aqueous solution was filtered to remove any insoluble material contained therein and the solution was adjusted to a pH of about 4.0 with hydrochloric acid. The acidified solution was extracted with naphtha, following which the aqueous solution was further acidified to a pH of 1.0. The solution was allowed to stand and the precipitation of crude 4-hydroxycoumarin resulted. This material was removed from the aqueous acid solution by filtration and oven dried to constant weight at a temperature of about 110° C. The crude 4-hydroxycoumarin was then dissolved in 1500 ml. of boiling water and allowed to cool to room temperature overnight. This resulted in the crystallization of pure 4-hydroxycoumarin, which was removed from the solution by filtration, and dried to constant weight in an oven at a temperature of about 110° C.

The pure 4-hydroxycoumarin was obtained in a yield of 33% of theory and it had a melting point of 202–206° C.

Having described my invention what I claim as new and desire to secure by Letters Patent is:

1. In a process for the production of 4-hydroxycoumarin, the improvement which comprises heating an excess of an acetylsalicylic acid ester with an alkali metal at a temperature of from about 110° C. to about 210° C., the excess of acetylsalicylic acid ester comprising the sole solvent in the reaction system.

2. In a process for the production of 4-hydroxycoumarin, the improvement which comprises heating about 2.0 mols of an acetylsalicylic acid ester with from about 1.0 to 1.2 mols of an alkali metal at a temperature of from about 110° C. to 210° C., the excess of acetylsalicylic acid ester comprising the sole solvent in the reaction system.

3. In a process for the production of 4-hydroxycoumarin, the improvement which comprises heating an excess of methyl acetylsalicylate with an alkali metal at a temperature of from about 110° C. to about 210° C., the excess of methylacetylsalicylate comprising the sole solvent in the reaction system.

4. In a process for the production of 4-hydroxycoumarin, the improvement which comprises heating an excess of ethyl acetylsalicylate with an alkali metal at a temperature of from about 110° C. to about 210° C., the excess of ethylsalicylate comprising the sole solvent in the reaction system.

5. In a process for the production of 4-hydroxycoumarin, the improvement which comprises heating from 2.0 mols of an acetylsalicylic acid ester with from about 1.0 to 1.2 mols of sodium at a temperature of from about 150° C. to 175° C., the excess of acetylsalicylic acid ester comprising the sole solvent in the reaction system.

6. A process for the production of 4-hydroxycoumarin which comprises heating an excess of an acetylsalicylic acid ester in the presence of an alkali metal at a temperature of from about 110° to 210° C. to form an alkali metal salt of 4-hydroxycoumarin, the excess of acetylsalicylic acid ester comprising the sole solvent present during the course of the reaction, adding an inert solvent to the reaction mixture, filtering the alkali metal salt of 4-hydroxycoumarin from the reaction mixture, drying the salt to constant weight, dissolving the salt in water, adjusting the solution to a pH of about 4.0, extracting the aqueous solution with an inert solvent, acidifying the aqueous solution to a pH of about 1.0 to 1.5, and recovering the 4-hydroxycoumarin which precipitates from the aqueous solution.

7. The process of claim 6, in which the acetylsalicylic acid ester is methyl acetylsalicylate.

8. A process according to claim 7 in which the alkali metal is sodium, and wherein about 2.0 mols of methyl acetylsalicylate are heated with from about 1.0 to 1.2 mols of sodium at a temperature of from about 150° to 175° C.

9. The process of claim 6, in which the acetylsalicylic acid ester is ethyl acetylsalicylate.

10. A process according to claim 9 in which the alkali metal employed is sodium and wherein about 2.0 mols of ethyl acetylsalicylate are heated with from about 1.0 to 1.2 mols of sodium at a temperature of from about 150° to 175°.

References Cited in the file of this patent

UNITED STATES PATENTS

| | | |
|---|---|---|
| 2,349,765 | Shelton | May 23, 1944 |
| 2,465,293 | Stahmann et al. | Mar. 22, 1949 |
| 2,471,047 | Stahmann | May 24, 1949 |

OTHER REFERENCES

Pauly et al.: Ber. Deut. Chem. 48 (1915), p. 28.
Jansen et al.: Z. physeol chem. 277, pp. 66–73 (1943).